United States Patent [19]
Wang et al.

[11] Patent Number: 5,790,953
[45] Date of Patent: Aug. 4, 1998

[54] SYSTEM AND METHOD FOR MANAGING SUBSCRIBER UNIT LOCATION INFORMATION IN AN INTEGRATED COMMUNICATION NETWORK

[75] Inventors: Zhonghe Wang, Lakeworth; Richard C. Bernhardt, Wellington, both of Fla.

[73] Assignee: Motorola, Inc., Schaumburg, Ill.

[21] Appl. No.: 517,978

[22] Filed: Aug. 22, 1995

[51] Int. Cl.$^6$ ........................................... H04Q 7/20
[52] U.S. Cl. ........................ 455/435; 455/417; 455/432; 455/435
[58] Field of Search ........................ 455/417, 432, 455/435

[56] References Cited

U.S. PATENT DOCUMENTS

| | | | |
|---|---|---|---|
| 5,276,905 | 1/1994 | Hurst et al. | 455/432 |
| 5,295,180 | 3/1994 | Vendetti et al. | 455/456 |
| 5,327,480 | 7/1994 | Breeden et al. | 455/417 |
| 5,357,561 | 10/1994 | Grube | 455/432 |
| 5,442,682 | 8/1995 | Svedin et al. | 455/435 |
| 5,444,765 | 8/1995 | Marui | 455/432 |
| 5,586,338 | 12/1996 | Lynch et al. | 455/525 |
| 5,588,043 | 12/1996 | Tiedemann, Jr. et al. | 455/435 |
| 5,613,204 | 3/1997 | Haberman et al. | 455/432 |
| 5,664,005 | 9/1997 | Emery et al. | 455/435 |
| 5,706,331 | 1/1998 | Wang et al. | 455/38.1 |

*Primary Examiner*—Dwayne D. Bost
*Assistant Examiner*—Jean A. Gelin
*Attorney, Agent, or Firm*—Pablo Meles

[57] ABSTRACT

A system and method are shown for registering a subscriber unit (10) in an integrated communication system having a number of subsystems (30, 50) that are capable of operating independently. The subscriber unit (10) stores in a memory (77) a list of outbound subsystems ordered according to the subscriber unit's preference for using the subsystem as a outbound home subsystem to which the subscriber unit registers. An inbound preferred home subsystem list is also stored in the memory (77). In order to register to the integrated system, the subscriber unit identifies the most preferred outbound subsystem that covers the current location of the subscriber unit as its outbound home subsystem. If the outbound home subsystem is a two-way subsystem having an inbound channel accessible by the subscriber unit, the subscriber unit uses the inbound channel of the outbound home subsystem to communicate the registration information to the integrated system. If the outbound home subsystem is a one-way subsystem, the subscriber unit utilizes the inbound preferred home subsystem list to identify the most preferred inbound subsystem covering the current location of the subscriber for use in communicating the new registration information to the integrated subsystem.

16 Claims, 4 Drawing Sheets

SYSTEM AND METHOD FOR MANAGING SUBSCRIBER UNIT LOCATION INFORMATION IN AN INTEGRATED COMMUNICATION NETWORK

FIELD OF THE INVENTION

The present invention relates to a subscriber unit such as a selective call radio frequency communication device and more particularly to such a device and method for registering the device in an integrated communication system having a number of subsystems that are capable of operating independently.

BACKGROUND OF THE INVENTION

Selective call radio frequency devices such as pagers and cordless telephones. i.e. CT-2 handsets, cellular telephones, radio telephones etc. are known for operating in independent communication systems. Integrated communication systems have combined two of these known independent systems as subsystems thereof for communication with combination subscriber units. A combination subscriber unit is a selective call communication device that includes the functionality of the different devices that operate in each subsystem alone, such as a combination pager and cordless telephone. Examples of such integrated systems and/or combination selective call communication devices are described in U.S. Pat. Nos. 5,392,542; 5,148,473; 5,202,912; and 5,307,399.

In order to communicate control traffic and message traffic to a subscriber unit, the system needs to know where the subscriber unit is located which is typically accomplished by a subscriber registration process. Known registration processes for integrated systems can result in an inefficient use of the subscriber unit's battery when implemented in an integrated system. Further, these processes generally do not support the full flexibility that can be obtained with an integrated system.

SUMMARY OF THE INVENTION

In accordance with the present invention, the disadvantages of prior systems and methods for registering a subscriber unit have been overcome. In accordance with the present invention, a subscriber unit system and method are provided for registering the subscriber unit in an integrated communication system having a number of subsystems that are capable of operating independently. Registration of a subscriber unit in accordance with the present invention is flexible, cost effective and battery efficient.

More particularly, in accordance with the present invention, a list of preferred outbound subsystems is stored in the subscriber unit. This list is ordered according to the subscriber unit's preference for using an outbound system as an outbound home subsystem to which the subscriber unit registers. The subscriber unit identifies the most preferred outbound subsystem in the stored list that covers the area in which the subscriber unit is located and determines whether this identified outbound subsystem is different from the subscriber unit's previously identified outbound home subsystem as stored in a memory of the subscriber unit. If the most preferred outbound subsystem covering the area in which the subscriber unit is located is different from the unit's stored outbound home system, the subscriber unit communicates new registration information to the integrated system to register the subscriber unit to the identified most preferred outbound subsystem as the subscriber unit's new outbound home subsystem. The subscriber unit also updates the information stored in its memory to identify the most preferred outbound subsystem currently covering the unit's location as the new outbound home subsystem of the subscriber unit.

In accordance with another feature of the present invention, a subsystem in the integrated system may be a two-way subsystem capable of receiving inbound traffic from a subscriber unit and also capable of transmitting outbound traffic to the subscriber unit. A subsystem in the integrated communication system may also be a one-way subsystem. For example, a one-way subsystem may be capable of only transmitting outbound radio frequency communication messages according to a particular signalling protocol. In order to accommodate such one-way subsystems, a list of preferred inbound subsystems is also stored in the subscriber unit wherein the list is ordered according to the preference of the subscriber unit using a subsystem for inbound communications. If the most preferred outbound subsystem covering the area in which the subscriber unit is located is a one-way subsystem, the subscriber unit identifies the most preferred inbound subsystem from the stored list of inbound subsystems, covering the area in which the subscriber unit is located. The subscriber unit then communicates the registration information to the most preferred outbound subsystem via an inbound channel of the identified, most preferred inbound subsystem.

These and other advantages and novel features of the present invention, as well as details of an illustrated embodiment thereof, will be more fully understood from the following description and drawings.

DESCRIPTION OF THE PREFERRED EMBODIMENT

An integrated communication system in accordance with the present invention includes multiple subsystems that are capable of operating independently. Any one of the subsystems may be either a two-way subsystem or a one-way subsystem. However, the integrated system should include at least one outbound subsystem that is capable of transmitting information or traffic to a subscriber unit 10 on an outbound channel and at least one inbound subsystem that is capable of receiving traffic from a subscriber unit 10 on an inbound channel.

Figure 1:
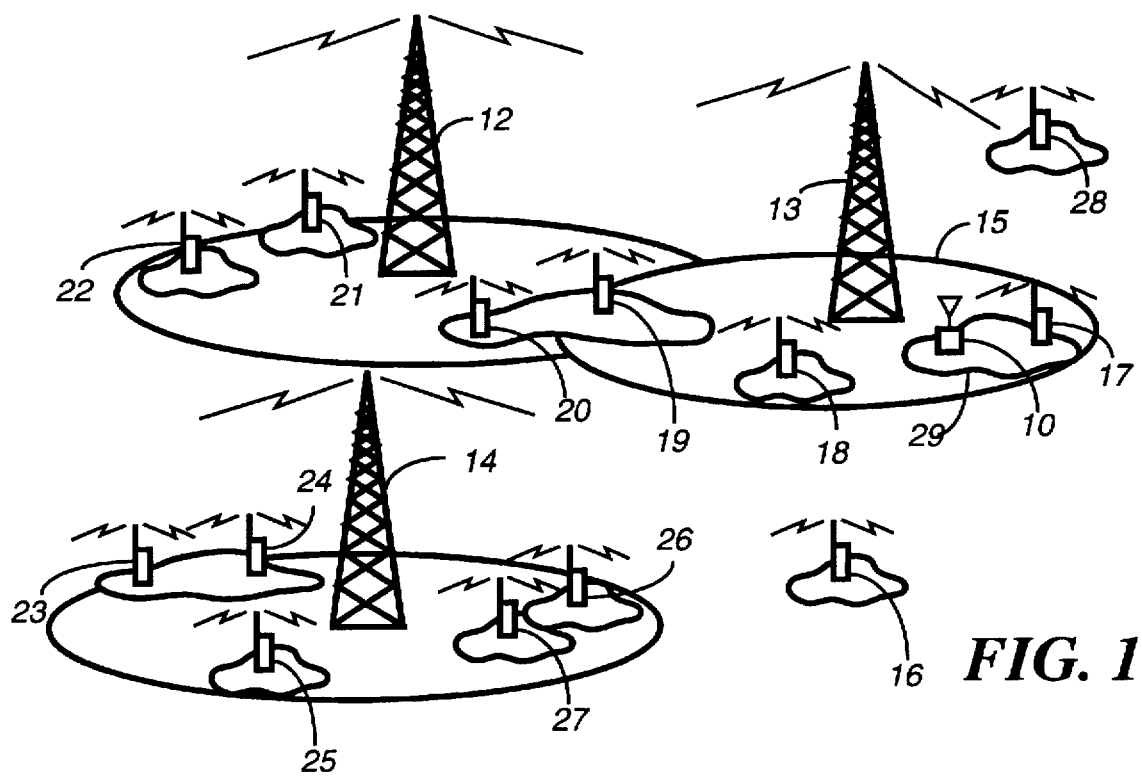
FIG. 1 is an illustration of an integrated system having independent subsystems with wide area and small area coverage.

FIG. 1 illustrates one example of an integrated communication system that includes one or more wide area subsystems with high power base stations 12–14 and one or more small area subsystems having low power transceiver hubs 16–28. A wide area subsystem is highly reliable and has excellent coverage and building penetration. A paging system is an example of a wide area subsystem as is a messaging system where information such as weather, sports, stocks and bonds, etc. is broadcast to multiple subscriber units having a common address. A small area subsystem typically has a very high system capacity for computer connectivity and interactive applications. An example of a small area subsystem is a wireless local area network (WLAN). However, a small area subsystem covers a relatively limited area such as a single building or a complex of buildings in a given location, the coverage area being relatively small due to the low power and high bit rate transceiver employed in such a subsystem. It is noted that although the integrated system of FIGS. 1 and 2 depict wireless subsystems, the subsystems of the integrated system in accordance with the present invention may be wired subsystems as well.

Figure 2:
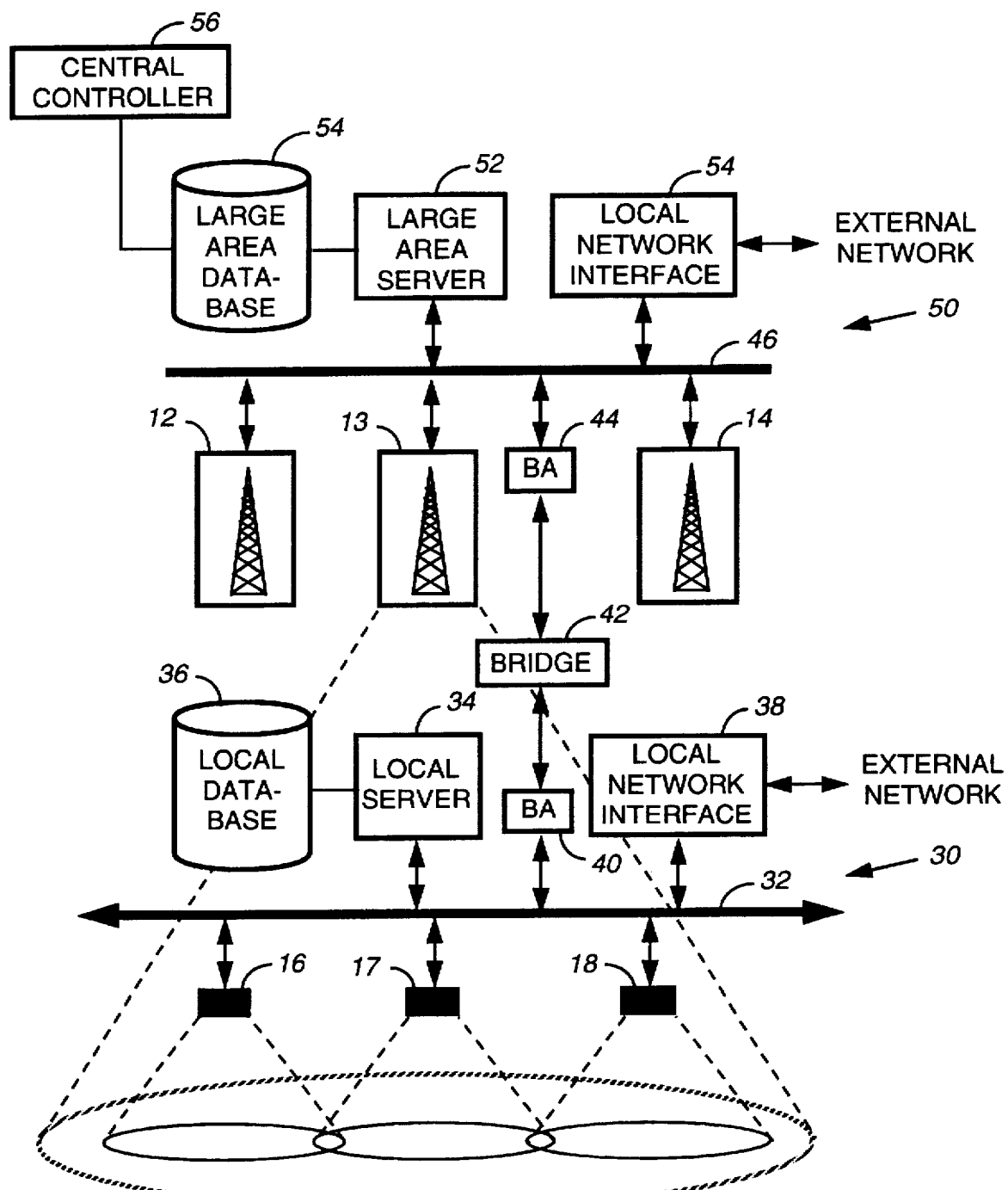
FIG. 2 is a block diagram of a modular radio network architecture for the integrated system depicted in FIG. 1.

FIG. 2 depicts a possible architecture of the integrated system of FIG. 1. As shown therein, each of the low power local hub transceivers of the small area subsystem 30 is coupled via a small area radio network 32 to a local server 34 having an associated database 36 that stores registration information, among other things, identifying the locations of subscriber units registered to the small area subsystem 30. The small area subsystem 30 is connected to an external network that may be wired or wireless via an appropriate local network interface 38. The small area radio network 32 is also coupled via a first bridge adapter 40 to a bridge 42 wherein the bridge 42 is coupled via a second bridge adapter 44 to the large or wide area radio network 46. The bridge 42 may be a software communication link or the like between the small area subsystem 30 and the wide area subsystem 50 to allow communications between these different subsystems or networks 32 and 46. The high power base stations 12–14 of the wide or large area subsystem 50 each include at least one transmitter unit and may include one or more receiver units associated with each transmitter unit. Each of the base stations 12–14 is coupled to a large area server 52 via the large area radio network 46. The registration information from subscriber units registered to the wide area subsystem 50 is stored in a large area database 54. After a subsystem 30 or 50 receives registration information from subscriber units 10, the subsystem 30, 50 communicates the registration information to a central controller 56 of the integrated system so that the central controller 56 knows where to locate the subscriber units and via which subsystem to communicate with the subscriber units. It is noted, that as shown in FIG. 2 the controller for the wide area subsystem 50 also serves as the central controller 56 of the integrated system. In another embodiment, a central controller that is separate from the controllers of the individual subsystems may be provided. Further, for a national or worldwide integrated system, a layered subscriber location database architecture such as shown in U.S. Pat. No. 5,274,845 assigned to the assignee of the present invention and incorporated herein by reference may be used.

Where one of the subsystems of the integrated system is a wide area paging system, the controller of that subsystem receives input messages or page initiation messages from a telephone or the like. The controller generates paging address and message information in accordance with a particular signalling protocol for transmission to an intended subscriber unit, i.e. a pager. The paging information is coupled from the subsystem controller to either a single transmitter unit such as a transmitter associated with a base station 12, 13 or 14 shown for the subsystem 50 or to a number of transmitter units in a zone. The one or more transmitter units transmit the page information as radio frequency (RF) signals via a respective antenna for reception by a particular subscriber unit 10 in accordance with an identification of the subscriber unit that is included in the transmitted information.

Figure 3:
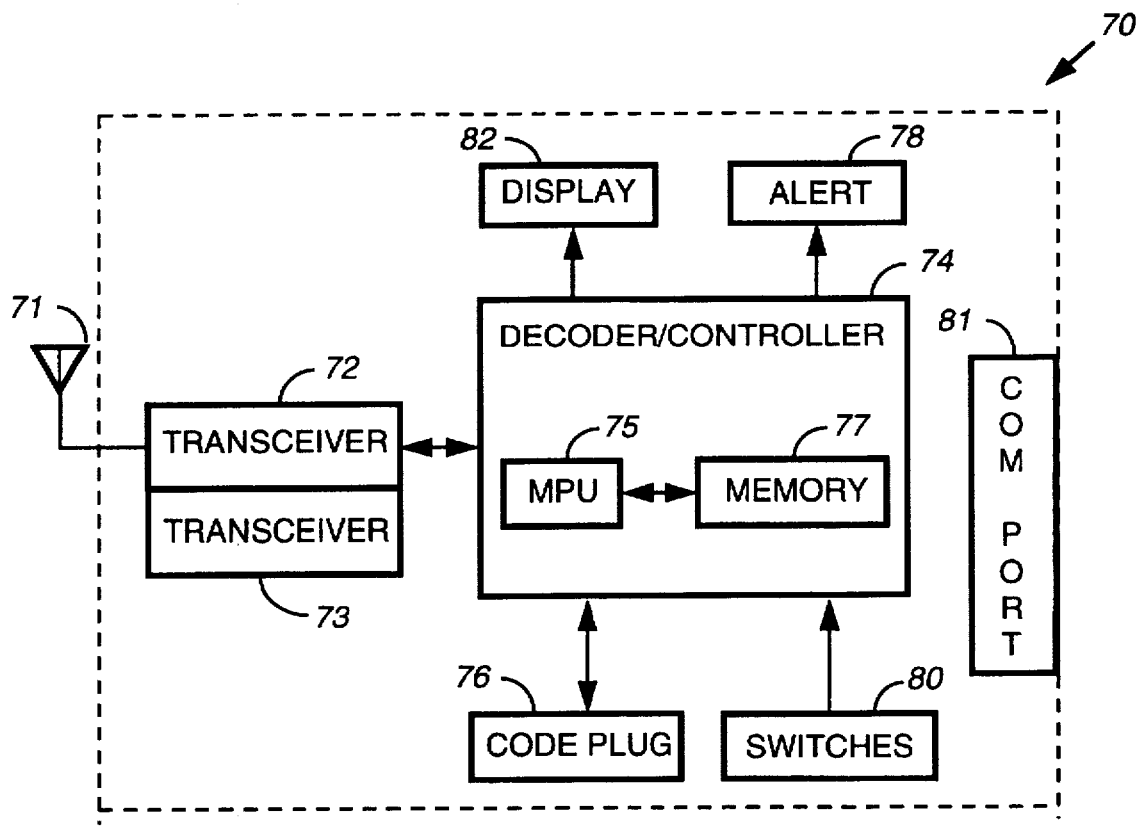
FIG. 3 is a block diagram of a selective call communication device in accordance with the present invention for operation in the integrated system of FIG. 1.

A subscriber unit 10 that is a portable two-way selective call communication device may take the form of a pager 70 as shown in FIG. 3. The pager 70 includes an antenna 71 for intercepting RF signals and for transmitting RF signals. The antenna 71 couples a received signal to one or more transceivers 72, 73 each of which is provided for communication with a particular subsystem. Each of the transceivers produces a data stream representative of a demodulated received signal coupled to a decoder/controller 74. The transceivers 72, 73 are also responsive to a modulation input such as data received from the decoder/controller 74 to frequency modulate a carrier signal for transmission out from the pager 70. As is well known in the art, the decoder/controller 74 may include a central processing unit such as a microprocessor 75 or the like for processing demodulated signal information in accordance with software stored in a memory 77 of the decoder/ controller 74. The decoder/controller 74 is also responsive to inputs from one or more switches 80 or other input devices to generate data that is coupled to a transceiver 72, 73 for transmission out from the pager 70. The RF signals transmitted by the transmitter units of a wide area paging subsystem typically include control information containing an address that identifies a particular pager 70 and any necessary zone information and/or queries. An associated alpha-numeric and/or voice message may also be included in the transmitted RF signals. The decoder/controller 74 decodes a received address by comparing it with one or more addresses stored in a code plug or code memory 76. If the decoder/controller 74 detects a match between a received address and a stored address, an alert signal may be generated by a device 78 so as to alert a user that a message has been received by the pager 70. The alert signal may be an audible and/or a tactile alert such as a silent vibrating alert. It is noted that if the RF signals only contain control information and no user viewable message, an alert need not be generated upon an address match. The switches 80 may be actuated by a user to select between the different types of alerts as well as for inputting information to the memory 77 and causing a message stored in the memory of the decoder/controller 74 to be accessed for display on a display 82. The switches 80 may also provide additional functions such as reset, read, delete, etc. as is well known. It will be apparent that the switches may form a keyboard. Alternative or additional input devices may also be included in or connected to the subscriber unit such as a touch panel, mouse, etc. The subscriber unit 10 may also include a conventional communication port 81 for a hardwired connection to a wired subsystem as well.

In order to aid in locating a subscriber unit 10 in a particular subsystem, the subsystems are divided into zone coverage areas. In an integrated system there are multiple types of zones, for example, the large coverage area zones of a wide area subsystem and the small coverage area zones of a small area subsystem as depicted in FIG. 1. More particularly, a zone is defined as the area covered by a set of transmitter units of a subsystem wherein the transmitter units in a zone simulcast the subsystem control information to a subscriber unit 10. Each zone has a zone identification (ZID) that is included in the control information broadcast by the transmitter units in the zone. The subsystem control information that is transmitted with the ZID also includes an identification of the transmitting subsystem itself.

Heretofore, existing registration techniques used to locate a subscriber unit in a system in order to page or address the subscriber unit and thereafter deliver message information or traffic to the subscriber unit, have only required the subscriber unit to register to the system when the subscriber unit crosses a zone boundary in the system. However, in an integrated system having multiple independent subsystems, a subscriber unit that is capable of operating in the multiple subsystems needs to determine an inbound subsystem to communicate its registration information as well as to determine the identity of the subsystem that the subscriber unit is registering to since the outbound subsystem to which the subscriber unit registers may be different from the subsystem whose inbound channel is selected to communicate the registration information on. For example, to register to a one-way paging system using an outbound only signalling protocol such as POCSAG, the subscriber unit may choose to use a small area subsystem channel such as a WLAN inbound channel in order to communicate the subscriber unit's registration information. When the WLAN subsystem receives the subscriber unit's registration information, it communicates the registration information to the integrated system's central controller 56 and to the one-way wide area paging system so that the one-way wide area paging system can be used to communicate outbound system control information to the subscriber unit 10.

Figure 4:
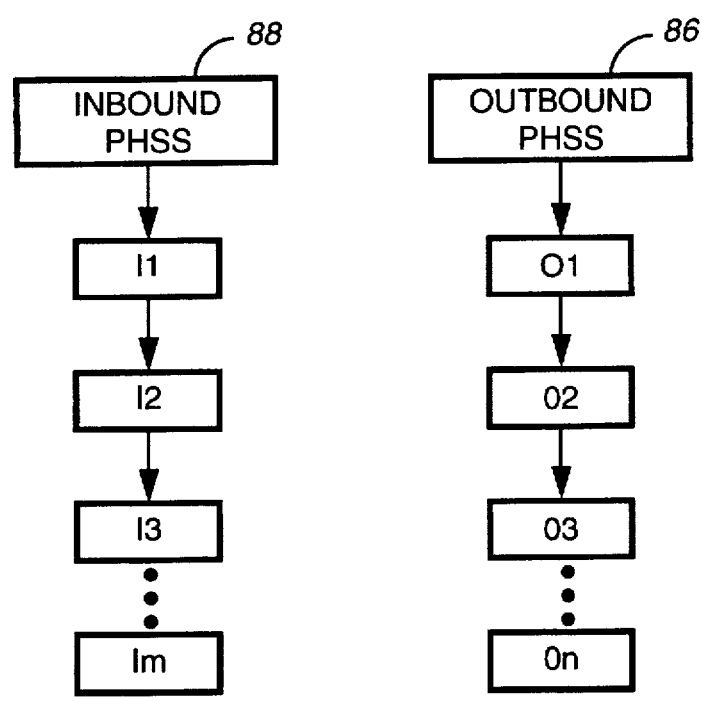
FIG. 4 is a block diagram illustration of the subscriber unit's inbound and outbound preferred home subsystem lists.

In order to determine the outbound subsystem that the subscriber unit should register to and the inbound subsystem that the subscriber unit should use to communicate the registration information on, the subscriber unit 10 employs a list 86 of preferred outbound subsystems and a list 88 of preferred inbound subsystems as shown in FIG. 4. For each subscriber unit that is able to access n outbound subsystems and m inbound subsystems, the preferred outbound home subsystem list 86 identifies n outbound subsystems and the preferred inbound home subsystem list 88 identifies m inbound subsystems. The list of preferred outbound subsystems 86 is ordered according to the subscriber unit's decreasing preference for using an outbound subsystem $O_1$–$O_n$ as the subscriber unit's outbound home subsystem. For example, the outbound subsystem $O_1$, is the most preferred outbound subsystem to be used as the outbound home subsystem for the subscriber unit 10; whereas the outbound subsystem $O_n$ is the least preferred subsystem to be used as the subscriber unit's outbound home subsystem. A subscriber unit's outbound home subsystem is the outbound subsystem to which the subscriber unit registers and from which the subscriber unit expects system control information. The system control information may include a "where are you" message that is transmitted from the subscriber unit's outbound home subsystem to determine the current location of a subscriber unit. The system control information may also include a "where to listen" message to direct the subscriber unit to a particular subsystem for receiving the message information to be transmitted since the message information may be communicated to a subscriber unit via a different subsystem than the subsystem used to communicate the control information associated with the message information. In accordance with the present invention, a subscriber unit's outbound home subsystem is dynamic and can change in accordance with the subscriber unit's location and preference as shown in the routine depicted in FIG. 5 as discussed below. It is noted that in order to save the subscriber unit's battery life, the preference given to outbound subsystems in the list 88 should take into account the size of the coverage area of the subsystem as well as the unit's intended use in the integrated system so that the subscriber unit need not register to the system frequently.

The list of preferred inbound subsystems 88 is also ordered according to the subscriber unit's decreasing preference for using an inbound subsystem $I_1$–$I_m$. The lists 86 and 88 of a subscriber unit's preferred outbound and inbound home subsystems are stored in the memory 77 of the decoder/controller 74 and preferably in a programmable portion thereof so that the subscriber is free to change the respective list 86 or 88 at any time. For example, if at a particular time the subscriber unit is being utilized by the subscriber mainly for its mobility, the most preferred home subsystem might be a wide area subsystem such as a paging subsystem. If the primary use of the subscriber unit changes such that it is connected to a wired communication network, the most preferred home subsystem may be changed to the wired network. Further, multiple preferred outbound home subsystem lists and multiple preferred inbound lists may be stored in the memory 77 wherein one list is selected from the multiple lists based on criteria such as intended use and/or whether a wired or wireless subsystem is to be used. Thus, the registration process in accordance with the present invention is not only extremely efficient in saving the battery life of the subscriber unit, but it is also extremely flexible to accommodate changes in the primary use of the subscriber unit according to the subscriber's private interests.

Figure 5:
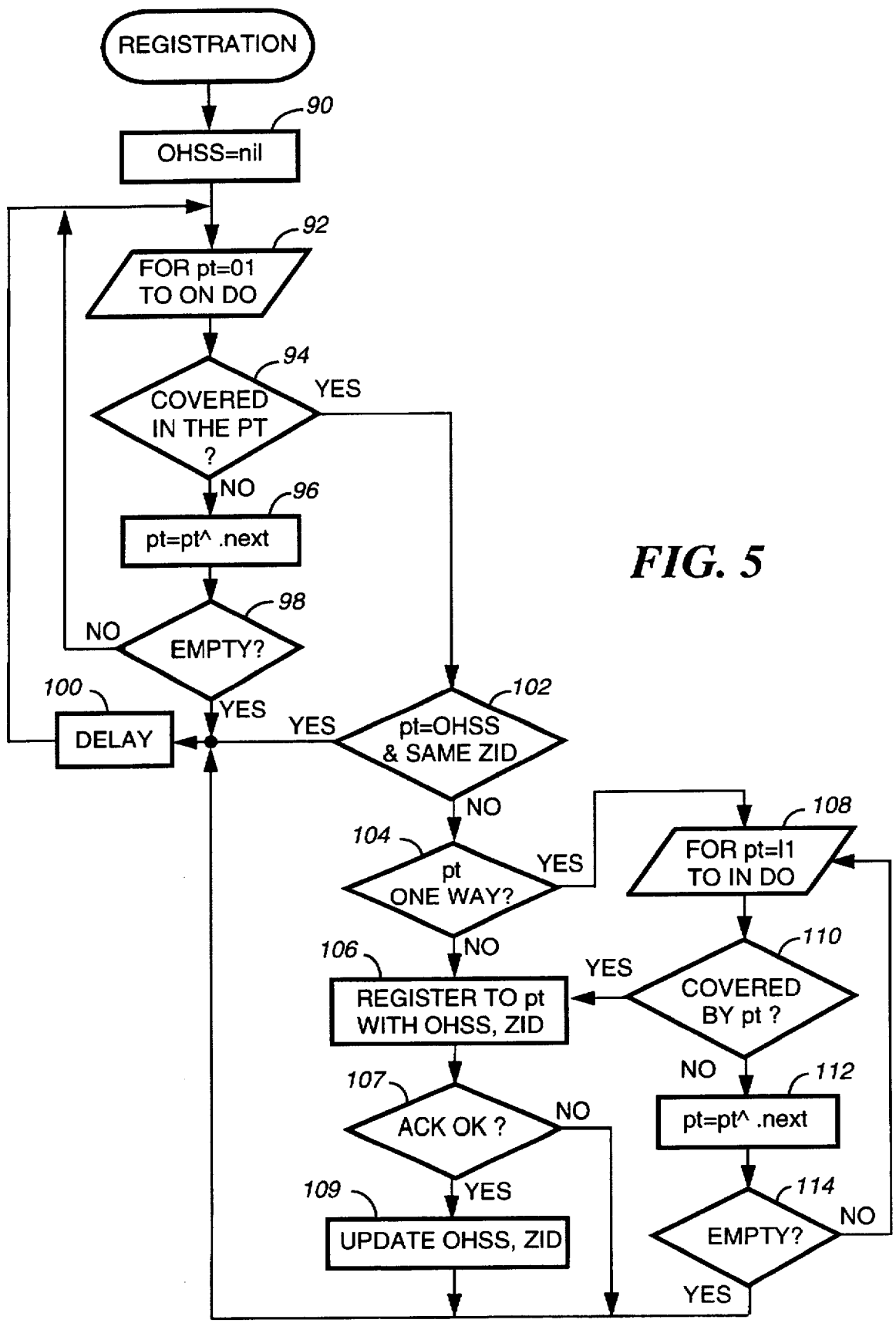
FIG. 5 is a flow chart illustrating a subscriber unit registration process in accordance with the present invention.

The registration process implemented by the subscriber unit 10 in accordance with the present invention is depicted in FIG. 5. At a block 90 the registration process is initialized by setting the outbound home subsystem parameter to nil indicating that no outbound home subsystem has been found as yet. Thereafter, at a block 92, the microprocessor 75 of the subscriber unit 10 sets a pointer pt to the most preferred outbound home subsystem in the list 86. At block 94, the microprocessor 75 determines whether the subsystem in the list 86 indicated by the pointer pt covers the area in which the subscriber unit is currently located. In order to determine whether wireless outbound subsystem does cover the current location of the subscriber unit 10, the subscriber unit 10 tries to synchronize to the subsystem indicated by the pointer pt. If the subscriber unit 10 receives and correctly decodes system control information from the indicated subsystem then the subscriber unit 10 determines that the identified subsystem does cover the current location of the subscriber unit and the microprocessor 75 proceeds to block 102 from block 94. In order to determine whether a wired subsystem covers the current location of a subscriber unit, the microprocessor 75 determines whether it can currently access the wired subsystem. If the microprocessor 75 determines at block 94 that the outbound subsystem indicted by the pointer pt does not cover the current location of the subscriber unit, the microprocessor 75 proceeds to block 96 to increment the pointer pt to indicated the next most preferred subsystem in the list 86. If each of the outbound subsystems in the list 86 has been checked and a subsystem has not been found that covers the current location of the subscriber unit as determined by the microprocessor at a block 98, the microprocessor 75 proceeds to block 100. At block 100, the microprocessor 75 waits a predetermined amount of time before again searching for an outbound home subsystem to which the subscriber unit registers. Thus, the microprocessor 75 checks the outbound subsystems stored in the list 86 one by one in decreasing order of the subscriber's preference for using the subsystem as its outbound home subsystem until the first outbound subsystem is found that covers the current location of the subscriber unit. This ensures that the subscriber unit will register to the most desirable subsystem that covers the location of the subscriber unit 10. The delay 100 is selected to provide good battery savings so that the subscriber unit is not searching for a new home subsystem to which to register more frequently than is necessary.

When the most preferred outbound subsystem from the list 86 that covers the current location of the subscriber unit is found as determined at block 94, the microprocessor 75 temporarily stores the system control information received therefrom. This system control information broadcast from the subsystem includes an identification of the transmitting subsystem as well as an identification of the zone (ZID) of the subsystem transmitting the control information. The microprocessor 75 at a block 102 compares the received subsystem identification and associated ZID with information representing the previously determined outbound home subsystem (OHSS) and its associated zone as stored in the memory 77. When the routine of FIG. 5 is first initialized as discussed above, OHSS is nil. Therefore the microprocessor 75 determines that the most preferred outbound subsystem identified at block 94 covering the location of the subscriber unit 10 is the unit's new outbound home subsystem (OHSS) at block 102 and the microprocessor proceeds to block 104. If an OHSS and its associated zone have been previously determined, the identification thereof will be stored in the memory 77. If the most preferred outbound subsystem and associated zone identified at block 94 are the same as the stored OHSS and its associated ZID, indicating that the subscriber unit is within the same zone and is still registered to the most preferred outbound subsystem covering the location of the subscriber unit, there is no need for the subscriber unit to transmit new registration information and the microprocessor 75 proceeds to block 100 from block 102. If, the pointer pt indicates an outbound subsystem that is different from the stored OHSS or if the ZID received with the subsystem control information at block 94 is different from the ZID that is stored in association with the OHSS, indicating that the subscriber unit has changed its location to a new zone, the microprocessor 75 proceeds from block 102 to block 104 to register to the integrated system.

The microprocessor 75 at block 104 determines whether the most preferred outbound subsystem covering the location of the subscriber unit and indicated by the pointer pt is a two-way subsystem or only a one-way subsystem. If the subsystem indicated by the pointer pt is a two-way subsystem, the microprocessor 75 proceeds to block 106. At block 106, the subscriber unit transmits via the transceiver 72, 73 associated with the indicated subsystem, registration information including the subscriber unit's identification, the identity of its new outbound home subsystem and its associated ZID utilizing an inbound channel of the newly identified outbound home subsystem. At block 107 the microprocessor 75 determines whether the integrated system acknowledged receipt of the transmitted registration information. If so, the microprocessor proceeds to block 109 to update the OHSS and associated zone identification stored in the memory 77 to identify the new outbound subsystem and zone identified at block 94 as the outbound home subsystem and associated zone of the subscriber unit. If no acknowledgement is received, the OHSS and associated zone identification stored in the memory 77 is not changed.

If the newly identified outbound home subsystem is not a two-way subsystem such that it does not have an inbound channel for receiving the registration information from a subscriber unit 10, the microprocessor 75 proceeds to block 108 from block 104 so as to determine if there is an inbound channel of an inbound subsystem that the subscriber unit 10 can access to communicate its registration information on. More particularly, at a block 108, the microprocessor 75 sets a pointer to the most preferred inbound subsystem in the list 88 stored in the memory 77. Thereafter, at a block 110 the microprocessor 75 determines whether the inbound subsystem indicated by the pointer covers the area in which the subscriber unit 10 is currently located as discussed above. If so, the microprocessor 75 proceeds to block 106 to utilize the inbound subsystem identified at block 110 to communicate to the integrated system the registration information including the subscriber unit's identification, the determined outbound home subsystem (OHSS) and its associated ZID. If the subsystem indicated by the pointer at block 108 does not cover the area in which the subscriber unit 10 is located as determined at block 110, the microprocessor 75 at block 112 increments the pointer to indicate the next most preferred subsystem in the preferred inbound subsystem list 88 and proceeds back to block 110 to determine whether that inbound subsystem covers the current location of the subscriber unit 10. Thus, the microprocessor 75 checks the inbound subsystems identified in the list 88 one by one until the most preferred inbound subsystem that covers the current location of the subscriber unit 10 is found. Once that inbound subsystem is found, it is used to communicate the updated registration information to the central controller 56 for subsequent communication to the outbound home subsystem identified therein.

It is apparent from the above discussion that if a subscriber unit 10 is located in an area such as shown in FIG. 1 covered by a wide area subsystem with base station 13 and associated zone 15 and a different subsystem such as a small area subsystem with the transceiver hub 17 and associated zone 29, the integrated system needs to determine which outbound subsystem to use to transmit system control information to the subscriber unit when the system has control information to send thereto. In accordance with the present invention, the subscriber unit selects the outbound subsystem to be used for communicating outbound system control information according to the subscriber unit's preference which can change over time. Thus, the registration process of the present invention is very flexible, user friendly and battery efficient. Many modifications and variations of the present invention are possible in light of the above teachings. Thus, it is to be understood that, within the scope of the appended claims, the invention may be practiced otherwise than as described hereinabove.

What is claimed and desired to be secured by letters patent is:

1. A method of operating a subscriber unit to register the subscriber unit in an integrated communication system having a plurality of subsystems capable of operating independently including at least one outbound subsystem capable of communicating to the subscriber unit on an outbound frequency channel and at least one inbound subsystem capable of receiving communications from the subscriber unit on an inbound frequency channel, said method comprising:

storing a list of preferred outbound subsystems, said list being ordered according to the preference of said subscriber unit using an outbound subsystem as an outbound home subsystem to which said subscriber unit registers;

identifying the most preferred outbound subsystem in said list covering an area in which said subscriber unit is located as the subscriber unit's outbound home subsystem, wherein said step of identifying the subscriber unit's outbound home subsystem includes the step of receiving subsystem information from at least one transmitter unit in a zone of an outbound subsystem, said subsystem information including zone identification information identifying said zone of the outbound subsystem and further including the steps of storing information representing the zone identified in said subsystem information received from the outbound subsystem identified as the subscriber unit's outbound home subsystem; comparing a zone identified in subsystem information received from a subsequently identified outbound home subsystem to said stored zone information; and communicating updated information to said subsequently identified outbound home subsystem if said zone identified in said subsystem information received for said subsequently identified outbound home subsystem is not the same as said stored zone information; and communicating registration information to said identified outbound home subsystem to register said subscriber unit in said identified outbound home subsystem.

2. A method of operating a subscriber unit to register the subscriber unit in an integrated communication system as recited in claim 1 including the steps of:

storing a list of preferred inbound subsystems, said list being ordered according to the preference of said subscriber unit using a subsystem for inbound communications from said subscriber unit;

identifying the most preferred inbound subsystem covering the area in which said subscriber unit is located; and communicating said registration information to said identified outbound subsystem via an inbound channel of said identified preferred inbound subsystem.

3. A method of operating a subscriber unit to register the subscriber unit in an integrated communication system as recited in claim 2 including the step of determining whether said identified outbound home subsystem is capable of receiving an inbound communication from the subscriber unit on an inbound channel, said identified outbound home subsystem being identified as said preferred inbound subsystem if it is determined that said identified outbound home subsystem is capable of receiving an inbound communication from said subscriber unit.

4. A method of operating a subscriber unit to register the subscriber unit in an integrated communication system as recited in claim 1 including the steps of:

storing information identifying said outbound home subsystem to which said subscriber unit communicated said registration information to;

comparing a subsequently identified outbound home subsystem to said stored information to determine if said subsequently identified outbound home subsystem is the same as said outbound home subsystem identified by said stored information; and communicating new registration information to said subsequently identified outbound home subsystem to register said subscriber unit to said subsequently identified outbound home subsystem if it is not the same as said outbound home subsystem identified by said stored information.

5. A method of operating a subscriber unit to register the subscriber unit in an integrated communication system as recited in claim 1 wherein at least one of said subsystems is a wide area subsystem.

6. A method of operating a subscriber unit to register the subscriber unit in an integrated communication system as recited in claim 1 wherein at least one of said subsystems is a small area subsystem.

7. A method of operating a subscriber unit to register the subscriber unit in an integrated communication system as recited in claim 1 wherein at least one of said subsystems is a wired subsystem.

8. A subscriber unit system for operating a subscriber unit to register the unit in an integrated communication system having a plurality of subsystems capable of operating independently including at least one outbound subsystem capable of communicating to the subscriber unit on an outbound frequency channel and at least one inbound subsystem capable of receiving communications from the subscriber unit on an inbound frequency channel, said subscriber unit system comprising:

a memory for storing a list of preferred outbound subsystems, said list being ordered according to the preference of said subscriber unit using an outbound subsystem as an outbound home subsystem for transmitting control information to said subscriber unit;

a processor for determining whether a preferred outbound subsystem in said list covers an area in which said subscriber unit is located;

a transmitter for transmitting registration information identifying the most preferred outbound subsystem covering the area in which the subscriber unit is located as the subscriber unit's outbound home subsystem for transmitting control information to said subscriber unit; and a receiver for receiving subsystem information from at least one transmitter unit in a zone of an outbound subsystem, said subsystem information identifying said zone and said outbound subsystem from which said subsystem information is received; said memory further storing information representing the zone identified in said subsystem information received from the outbound subsystem identified as the subscriber unit's outbound home subsystem; said processor includes means for comparing a zone identified in subsequently received subsystem information to said stored zone information, and said transmitter transmits updated registration information identifying said zone identified in said subsequently received subsystem information if said zone identified in said subsequently received subsystem information is not the same as said stored zone information.

9. A subscriber unit system for operating a subscriber unit to register the unit in an integrated communication system as recited in claim 8 wherein said memory further stores a list of preferred inbound subsystems, said list being ordered according to the preference of said subscriber unit using a subsystem for inbound communications from said subscriber unit; and said processor further includes means for identifying the most preferred inbound subsystem covering the area in which said subscriber unit is located, and said registration information being transmitted by said transmitter via an inbound channel of said identified preferred inbound subsystem.

10. A subscriber unit system for operating a subscriber unit to register the unit in an integrated communication system as recited in claim 9 wherein said processor includes means for determining whether said identified preferred outbound subsystem is capable of receiving an inbound communication from the subscriber unit on an inbound channel, said identified outbound home subsystem being identified as said preferred inbound subsystem if it is determined that said identified outbound subsystem is capable of receiving an inbound communication from said subscriber unit.

11. A subscriber unit system for operating a subscriber unit to register the unit in an integrated communication system as recited in claim 8 wherein said memory stores information representing said preferred outbound subsystem identified in said registration information as the subscriber unit's outbound home subsystem; and said processor includes means for comparing a subsequently identified outbound home subsystem to said stored information representing the unit's home subsystem to determine if said subsequently identified outbound home subsystem is the same as said outbound home subsystem, and said transmitter transmitting new registration information identifying said subsequently identified outbound home subsystem as the subscriber unit's new home subsystem if said subsequently identified outbound home subsystem is not the same as the outbound subsystem identified by said stored information as the subscriber unit's outbound home subsystem.

12. A subscriber unit system for operating a subscriber unit to register the unit in an integrated communication system as recited in claim 8 wherein at least one of said subsystems is a wide area subsystem.

13. A subscriber unit system for operating a subscriber unit to register the unit in an integrated communication system as recited in claim 8 wherein at least one of said subsystems is a small area subsystem.

14. A subscriber unit system for operating a subscriber unit to register the unit in an integrated communication system as recited in claim 8 wherein at least one of said subsystems is a wired subsystem.

15. A subscriber unit system for operating a subscriber unit to register the unit in an integrated communication system having a plurality of subsystems capable of operating independently including at least one outbound subsystem cable of communicating to the subscriber unit on an outbound frequency channel and at least one inbound subsystem capable of receiving communications from the subscriber unit on an inbound frequency channel, each of said subsystems having one or more zones of coverage area associated therewith and each zone having an associated zone identification, said subscriber unit system comprising:

means for storing a list of preferred outbound subsystems in order of preference, an identification of an outbound home subsystem and an identification of a zone in said outbound home subsystem;

a receiver for receiving radio frequency messages including subsystem information transmitted in a zone of an outbound subsystem included in said list, said subsystem information including an identification of the zone and the outbound subsystem from which said subsystem information is transmitted;

a processor for determining whether the most preferred outbound subsystem from which subsystem information is received and the zone identified in said received subsystem information are the same as said stored outbound home subsystem and stored zone of the outbound home subsystem, said processor updating said storing means to store an identification of said most preferred outbound subsystem and said zone identified in said received subsystem information as a new home outbound subsystem and zone thereof if said most preferred outbound subsystem or zone are not the same as said previously stored home subsystem and zone; and a transmitter for transmitting registration information whenever a new home subsystem or associated zone is determined.

16. A method of operating a subscriber unit to register the subscriber unit in an integrated communication system having a plurality of subsystems capable of operating independently including at least one outbound subsystem capable of communicating to the subscriber unit on an outbound frequency channel and at least one inbound subsystem capable of receiving communications from the subscriber unit on an inbound frequency channel, said method comprising:

storing in a memory a list of preferred outbound subsystems, an identification of an outbound home subsystem and an identification of a zone in said outbound home subsystem;

receiving radio frequency messages including subsystem information transmitted in a zone of an outbound subsystem included in said list, said subsystem information including an identification of the zone and the outbound subsystem from which said subsystem information is transmitted;

determining whether a most preferred outbound subsystem from which subsystem information is received and the zone identified in said received subsystem information are the same as said stored outbound home subsystem and stored zone of the outbound home subsystem;

updating said memory to store an identification of said most preferred outbound subsystem and said zone identified in said received subsystem information as a new home outbound subsystem and zone thereof if said most preferred outbound subsystem or zone are not the same as said previously stored home subsystem and zone; and communicating registration information whenever a new home subsystem or associated zone is identified.

* * * * *